(12) United States Patent
Korotkov

(10) Patent No.: US 10,325,030 B2
(45) Date of Patent: Jun. 18, 2019

(54) DURABLE MULTIVERSION B+-TREE

(71) Applicant: ORIOLE DB INC, Marina Bay (GI)

(72) Inventor: Alexander Evgenievich Korotkov, Moscow (RU)

(73) Assignee: Oriole DB Inc. (GI)

( * ) Notice: Subject to any disclaimer, the term of this patent is extended or adjusted under 35 U.S.C. 154(b) by 0 days.

(21) Appl. No.: 16/017,854

(22) Filed: Jun. 25, 2018

(65) Prior Publication Data

US 2018/0373743 A1   Dec. 27, 2018

Related U.S. Application Data

(60) Provisional application No. 62/524,555, filed on Jun. 25, 2017.

(51) Int. Cl.
| | | |
|---|---|---|
| *G06F 11/14* | (2006.01) | |
| *G06F 12/0804* | (2016.01) | |
| *G06F 17/30* | (2006.01) | |

(52) U.S. Cl.
CPC .... *G06F 17/30327* (2013.01); *G06F 11/1471* (2013.01); *G06F 12/0804* (2013.01); *G06F 17/30371* (2013.01); *G06F 2201/80* (2013.01)

(58) Field of Classification Search
CPC ........... G06F 11/1471; G06F 17/30327; G06F 17/30336; G06F 2201/82
See application file for complete search history.

(56) References Cited

U.S. PATENT DOCUMENTS

2008/0307181 A1* 12/2008 Kuszmaul ........... G06F 11/1471
                                                    711/164
2017/0337212 A1* 11/2017 Hayasaka ............... G06F 3/061

OTHER PUBLICATIONS

R. Bayer and E. McCreight. Organization and maintenance of large ordered indices. In Proceedings of the 1970 ACM SIGFIDET (now SIGMOD) Workshop on Data Description, Access and Control, SIGFIDET '70, pp. 107-141, New York, NY, USA, 1970. ACM.
Philip A Bernstein, Vassos Hadzilacos, and Nathan Goodman. Concurrency Control and Recovery in Database Systems. Addison-Wesley, 1987.
Douglas Comer, Ubiquitous b-tree. ACM Computing Surveys (CSUR), 11(2):121-137, 1979.
Michael Cahill, A Technical Introduction to WiredTiger, MongoDB, www.slideshare.net/mongodb/mongo-db-wiredtigerwebinar, Jul. 9, 2015.
Database Language SQL. Standard, International Organization for Standardization, 1992.

(Continued)

*Primary Examiner* — Taelor Kim
(74) *Attorney, Agent, or Firm* — Kevin R. Greenleaf; Dentons US LLP

(57) ABSTRACT

Embodiments of the systems and methods disclosed include a durable multiversion modification of B+-tree with full transaction semantics. In-memory and persistent page images are managed without a buffer manager. Instead, a non-leaf page downlink directly points either to in-memory or on-disk pages. In turn, the reduced amount of fetches per page access improves scalability on multi-core hardware platforms. Embodiments include structurally consistent copy-on-write checkpoints that enable using row-level write-ahead logs. In combination with in-memory undo log for multiversion concurrency control, the amount of persistent storage operations is significantly reduced.

20 Claims, 9 Drawing Sheets

(56) References Cited

OTHER PUBLICATIONS

Howard Chu, MDB: A Memory-Mapped Database and Backend for OpenLDAP, Symas Corp., OpenLDAP Project, hyc@symas.com, hyc@openldap.org, http://www.symas.com, http:www.openldap.org, 2011.

C. Mohan, Don Haderle, Bruce Lindsay, Hamid Pirahesh, and Peter Schwarz. Aries: a transaction recovery method supporting fine-granularity locking and partial rollbacks using write-ahead logging. ACM Transactions on Database Systems (TODS), 17(1):94-162, 1992.

* cited by examiner

DURABLE MULTIVERSION B+-TREE

CROSS REFERENCE TO RELATED APPLICATION

This application claims priority to U.S. Provisional Patent Application Ser. No. 62/524,555, filed on Jun. 25, 2017, which is hereby incorporated by reference in its entirety.

BACKGROUND

B+-trees are used in a many applications, including but not limited to file systems (FS) and database management systems (DBMS). In relational DBMS's B-trees may serve as a primary storage for the table rows as well as a secondary index for them. In a similar way, document-oriented DBMS's B-trees can serve as a primary storage or secondary index for documents. In DBMS's utilizing other data models, B-trees likewise can serve as primary or secondary data storage.

Here and above we will describe a B+-tree and its modifications storing table rows. However, all the statements about such trees are also true for storing documents or other data items. Data items can have an extractable key, and these keys can be comparable. That is for given two keys A and B, key A is less than, equal to, or greater than B.

While typically used for storing the data on the disk, B+-trees are also frequently used as a main memory data structure. B+-trees use relatively large nodes in comparison with red-black trees or AVL trees. Such node sizes appear to be efficient for managing a large amount of data in main memory, because it provides better data locality.

Here and below we will refer to any persistent data storage device as disk. Persistent storage devices include but not limited to magnetic disk device, solid state drive (SSD), non-volatile random access memory (NVRAM) and network-distributed media.

Considering B+-tree stored on disk, the nodes of a B+-tree can be copied from the disk to the main memory before their contents can be accessed by a computer's processor. If the main memory area allocated to store contents of nodes is already full, then one of the already loaded nodes can be evicted from main memory. If that node has been modified, then it can be written back to disk before being removed from main memory. Typically these routines in DBMS are controlled by separate subsystem called a "buffer manager.".

Many of DBMS's implement transactions with ACID properties, i.e., Atomicity, Consistency, Isolation, and Durability, which may create restrictions on the DBMS.

The durability requirement means that after a system crash, the DBMS should be able to recover the database once disk media was saved. Recovery needs to bring the database to a consistent state, which restores all transactions confirmed before the crash. Therefore, any transaction needs to reach to the disk media before being confirmed.

Transactions might reach disk media by writing all the data, which it has to modify. However, this approach has number of shortcomings. First, data modified by transactions may rely at random places of disk media. That means the DBMS has to complete a lot of random disk writes, which could cause a serious performance penalty. Second, the DBMS typically divides information into blocks, which are not necessarily being written atomically. So, DBMS crashes may happen in the middle of a block write, making it difficult to recover after such a partial write.

A Common approach to implement durability and evade the above difficulties is the write-ahead log (WAL). Using WAL, writing modified pages can be postponed. For every data modification, the WAL record is updated before the modification is completed. WAL is an append-only journal, which is stored on the disk media.

Even if modifications made to the pages are lost due to a DBMS crash, all necessary information is saved in the WAL. During recovery, lost changes are replayed using the WAL. It's important for WAL records to be idempotent. So that if the modification is already applied to the disk, the corresponding WAL record just does nothing.

WAL records can reach disk, before corresponding changes in the data itself do. In order to provide that, buffer manager is tightly coupled with WAL subsystem. Transactions can be confirmed after all corresponding WAL records are written. During recovery, DBMS can replay WAL records bringing the database to the state that has all confirmed transactions.

Transaction isolation requirements mean that concurrent execution of the transactions produces the same effect as some serial execution of those same transactions. Since strict following of this isolation definition could be costly, SQL standards define more relaxed isolation levels. Transaction isolation could be implemented using either optimistic or pessimistic locking when a reader and a writer of data could block each other. Another approach is multiversion concurrency control (MVCC) when a writer makes a new version of a modified data item while a reader could see an older version of the same data item without being blocked. MVCC allows transactions to see immutable snapshots of the database.

There are various ways to implement MVCC. For instance, a physical copy of a row could be marked with its creator and destructor transaction identifiers. Also, old versions of data items could be placed into a separate data structure called an "undo log", which could be either block-level or row-level or mixed. Primary and secondary data structures can support snapshots independently. Alternatively, secondary data structures can contain links to multiple possible versions of data, relying on a visibility check while fetching from primary data structure.

BRIEF DESCRIPTION OF THE DRAWINGS

For a more complete understanding of the invention, reference is made to the following description and accompanying drawings. Understanding that these drawings depict specific embodiments of the invention and are not therefore to be considered to be limiting of its scope, the drawings are not necessary in scale, emphasis instead being placed upon illustrating the principles of the invention with additional specificity and detail, in which.

DETAILED DESCRIPTION

Figure 1:
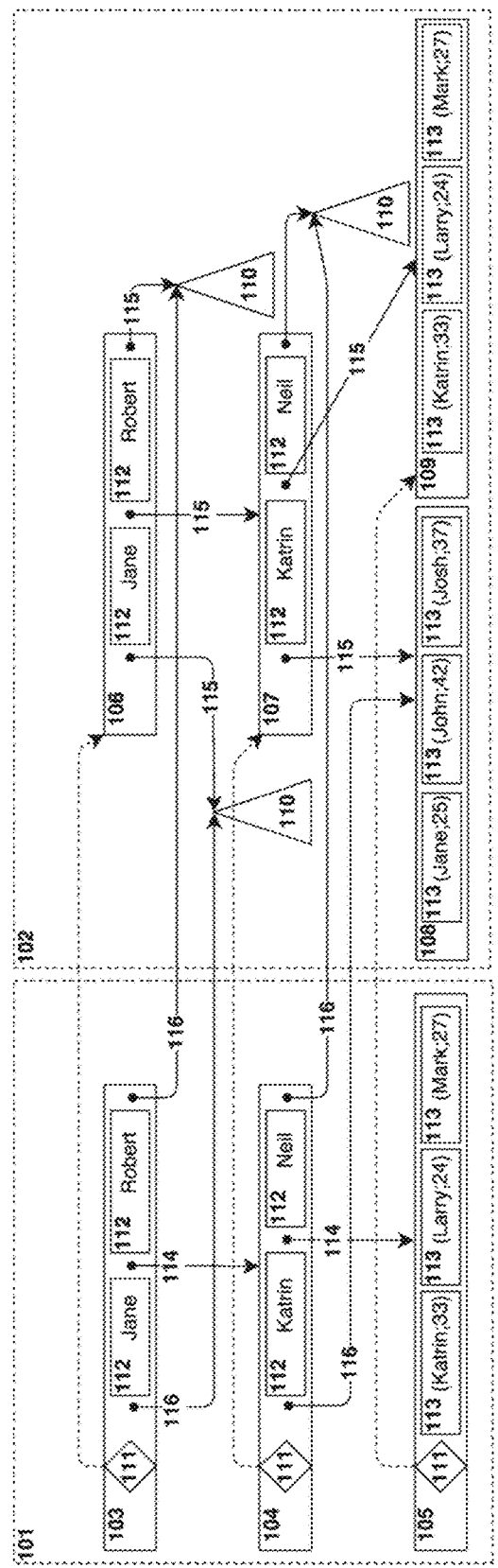
FIG. 1 is an example of Bz-tree layout in main memory and disk.

Embodiments can be used to implement a variation of the B+-tree that supports durability and MVCC, called Bz-tree herein. Durability can be supported using, for example, a buffer manager and a block-level WAL, or full data checkpoints and a row-level WAL. There are multiple ways to implement MVCC support for B+-tree, including block-level or row-level or mixed undo log, or storing multiple versions of data items together in a database while appending auxiliary transactional information to them.

New WAL records can be continuously written during DBMS operations. To prevent the WAL from growing infinitely, it can be periodically cut using "checkpointing." During checkpointing, all the modified pages can be written to the disk. After that, all WAL records written before checkpointing are not needed for recovery, because corresponding modifications have already been written to the disk media.

During recovery, secondary data structures could be rebuilt from scratch, although that could lead to significant performance penalties. Primary data structures may not have the option and need to be recoverable. Thus, B+-tree implementations can be WAL-logged to avoid this problem. A buffer manager serves as barrier that do not allow modified nodes to be written to the disk before corresponding WAL records are written there.

An alternative approach to providing durability is using copy-on-write checkpoints. With copy-on-write checkpoints, disk blocks are not rewritten in-place, but writes are made to free disk blocks. Thanks to that, a consistent database state can be achieved without replaying block-level WAL records, because there is always a consistent checkpoint on the disk. DBMSs utilizing copy-on-write checkpoints may not use WAL altogether while performing checkpoint for each transaction, or performing them rarely and allowing loss of some recent transaction in the case of server crash. Some DBMSs utilize copy-on-write checkpoints together with a WAL. In this case, WAL records could be "row-level", i.e., contain information about changed rows (or documents depending on the data model) instead of block-level information. Also, secondary data structures could be recovered without having explicit information about their changes in the WAL. That allows DBMSs utilizing copy-on-write checkpoints to have much less WAL-traffic, in turn giving them substantial advantages to DBMSs utilizing traditional checkpoints.

However, modern implementations of copy-on-write checkpoints have shortcomings. Requirement that checkpoints need to be consistent causes concurrency problems. One option to meet this requirement is to stop writing operations in the database during checkpointing, but that doesn't work for large databases with a high load of writing transactions. Another option is to allow writing transactions concurrently with checkpointing, but let the checkpointer see a consistent snapshot of data using MVCC. But while operating large databases under high load, checkpointing appears to be a prolonged operation. In order to make checkpoints consistent, old versions of rows have to be kept during the whole checkpointing operation causing serious overhead.

Prior art approaches to database durability had problems including a large block-level WAL and overhead of taking a consistent checkpoint while concurrently writing transactions. Embodiments of this disclosure include solutions to these problems by placing relaxed requirements to consistency of copy-on-write checkpoints. Instead of making traditional checkpoints or consistent copy-on-write checkpoints, these embodiments can make structurally consistent copy-on-write checkpoints, while transactional consistency is achieved by replaying WAL records. A structurally consistent checkpoint constitutes a correct tree: referentially integrated, height-balanced, correctly ordered and so on. But it can contain row versions, which were valid in different periods of time between checkpointing begin and end. Thanks to that, copy-on-write checkpointing can work concurrently with writing transactions without keeping old version of rows for the checkpointer. Structural consistency of checkpoints allows using a row-level WAL, which is much more compact than a block-level WAL used with traditional checkpoints.

The present disclosure is here described in detail with reference to embodiments illustrated in the drawings, which form a part here. Other embodiments may be used or other changes may be made without departing from the spirit or scope of the present disclosure. The illustrative embodiments described in the detailed description are not meant to be limiting of the subject matter presented here.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, to avoid unnecessarily obscuring the relevant description.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Reference will now be made to the exemplary embodiments illustrated in the drawings, and specific language will be used here to describe the same. It will nevertheless be understood that no limitation of the scope of the embodiments is thereby intended. Alterations and further modifications of the features illustrated here, and additional applications of the principles of the embodiments as illustrated here, which would occur to one skilled in the relevant art and having possession of this disclosure, are to be considered within the scope of this disclosure.

Bz-tree is a variation of B+-tree which allows operation with trees larger than main memory can hold. However, Bz-tree manages in-memory and on-disk pages without explicit mapping from on-disk page addresses to in-memory page images (which is typically provided by the buffer manager). The memory space of the Bz-tree can exist both in memory and on disk without the need for a virtual address space managed by a buffer manager.

Instead, non-leaf in-memory pages contain downlinks that directly point or contain physical addresses to either in-memory or on-disk pages.

Bz-tree could be accessed by multiple processes/threads concurrently. In particular embodiments, DBMS run on multiple threads while in-memory pages of Bz-tree are located in the process memory. In other embodiments, the DBMS can run on multiple processes while in-memory pages of Bz-tree are located in the shared memory.

FIG. 1 depicts an example of Bz-tree layout in the main memory 101 and on the disk 102. This Bz-tree store rows consisting from one string and one integer. In this example the string of each row 113 serves as a tree key while the integer serves as a value. In the given example, the Bz-tree stores rows 113, but the Bz-tree is able to store documents or other data items depending on the data model.

Disk 102 contains a structurally consistent on-disk checkpoint of a Bz-tree. On-disk checkpoints of Bz-trees are made in an incremental manner and will be referred to as the checkpoints. Checkpoints will be described in detail later herein. The following on-disk pages of a Bz-tree are shown on the figure: root page 106, internal page 107 and leaf pages 108 and 109, and subtrees 110, which aren't shown in detail and hidden in triangles for the sake of brevity. Non-leaf pages contain pivot keys 112 and downlinks 115. Leaf on-disk pages contain rows 113.

Checkpoints of Bz-trees are called "structurally consistent" because they contain correct trees, e.g., they are referentially integrated, height-balanced, and correctly ordered and so on. However, such checkpoints may not be necessarily transactionally consistent. That is they may contain a combination of data items versions, which never existed together in the database. That happens because of tree modification operations concurrent to the checkpoint taking process.

Main memory 101 depicts part of a Bz-tree loaded into the main memory. Similar to on-disk pages, in-memory pages of Bz-tree include root page 103, internal page 104 and leaf page 105. Every in-memory page of the Bz-tree contains a link 111 to an associated on-disk page which is depicted as a rhombus with an outgoing dash arrow. Non-leaf pages contain pivot keys 112 and downlinks 114 to in-memory pages and downlinks 116 to on-disk pages. In-memory leaf pages contain rows 113.

A Bz-tree can allow for maintaining trees larger than main memory without using of buffer manager. While traversing an in-memory page downlink, it might appear that the downlink 114 points to another in-memory page. In this case, no special actions are needed. In the other case, the downlink 116 could point to the on-disk page. Then a corresponding on-disk page could be loaded into main memory. Therefore, a Bz-tree may not have to map on-disk page addresses to in-memory page addresses using a buffer manager. That leads to a significant advantage in reducing the number of memory accesses per page access, which in turn improves scalability on multi-core hardware platforms.

Least used in-memory pages could be evicted to the disk to free main memory using least recently used (LRU) or another appropriate algorithm. If a page being evicted was not modified since it was written to the disk last time, then a downlink to the evicted page can just be replaced with a link to the associated on-disk page. If a page being evicted was modified, then it should be written to the disk first. After that downlink to the evicted page would be replaced with a link to the recorded disk image of the evicted page. When a page is written for the first time after a checkpoint, then it can be written to the free space of the disk rather than rewrite the checkpoint image. Otherwise, the on-disk image could be rewritten in-place. This aspect is described further below in the context of copy-on-write checkpoints.

Non-leaf pages could be evicted to the disk as well as leaf pages. However, a non-leaf page could be evicted to disk only when it doesn't have downlinks to any in-memory pages, that is all its children were evicted before. Therefore, on-disk pages only refer other on-disk pages; on-disk pages might never refer to in-memory pages.

When a Bz-tree is accessed by multiple processes/threads simultaneously, then various concurrency issues may occur. While one session is looking for a leaf page containing some key, another session could evict this leaf page or even an internal page above it. Embodiments address these issues either with coarse-grained or fine-grained locking, reduced locking, lock-less or lock-free approaches, their combinations and/or other concurrency mechanisms. Lock-less and lock-free approaches preferable because they provide better scalability on modern multi-core hardware platforms. For example, some embodiment can assign unique identifiers to every page and include identifiers of a target page into downlinks together with a target page address. Thus, while traversing downlink processes/threads could detect concurrent page eviction, then re-read downlink and re-try traversing.

During data modification operations, Bz-tree can move previous versions of rows and sometimes whole page images into an undo log. The undo log is an append-only data structure containing records which are directly referenced from Bz-tree pages, rows and other undo log records. Database processes/threads can see the consistent snapshots of the data by fetching relevant undo log records when needed. Therefore, Bz-tree supports MVCC.

The Bz-tree undo log may not require persistence or explicit WAL logging. That makes it possible to implement the undo log as a data structure residing purely in-memory. However, the undo log may be stored on disk if necessary. The design of Bz-tree persistence without undo log persistence is explained later herein where checkpoints and WAL-logging are considered.

Particular embodiment can implement an undo log as a circular in-memory buffer. Thus, new undo records would override old undo records written to the same place of buffer before. Attempts to fetch overwritten undo records could cause a "snapshot too old" error. Also, active transactions should preserve the ability to rollback, so their undo records shouldn't be overwritten. To provide this, a transaction that is going to override an undo record of another active transaction should either wait for it to finish or abort it.

Other embodiments can implement an eviction of oldest undo records to the disk. Fetching undo records from the disk is rather slower, such embodiment wouldn't suffer from this strict limitation on volume of active transactions and snapshot-lifetime mentioned above.

We assume Bz-tree to work inside a transactional DBMS providing ACID properties. We make following assumptions about that transactional DBMS.

DBMS should assign integer identifiers to each transaction. We call this identifier a transaction number (TXN). TXNs are typically sequential in most of systems, but we don't place it as a restriction.

DBMS should assign an integer number called a commit log sequence number (LSN) to each committed transaction. This number should reflect the order of transaction commit, but are not necessarily sequential (that is the sequence of LSNs is ascending, but could contain gaps).

DBMS should provide a map from TXN to LSN. n particular, it should be possible to resolve all the TXNs which are stored in the Bz-tree into LSNs. This requirement is explained in details below.

The DBMS should assign LSNs to transaction snapshots. Therefore, transactions should see the changes made by transactions whose LSNs are lesser than the snapshot LSN, but it shouldn't see changes of transactions which are committed later.

To support MVCC, each row of the Bz-tree in-memory leaf page contains the following attributes in addition to the data itself:

transactional information: either TXN or LSN. We will denote TXN as a number with prefix "T." For example, TXN 7 will be denoted as "T7." We will denote LSN as a number and prefix "L." For example, LSN 11 will be denoted as "L11";

undo-log pointer: points to undo record, which should be used in order to reconstruct previous version of this row;

deleted flag: a boolean flag indicating that this row was deleted.

The attributes of above will be further referenced as "MVCC attributes." Transactional information identifies a transaction which has created a version of a row. When this transaction is already committed, then its TXN could be rewritten with an LSN. This LSN identifies the moment of time when the corresponding transaction was committed, and subsequently it identifies the moment of time when this row version became visible to the other transactions.

On insertion of a new row into the Bz-tree, it contains following values of MVCC attributes:

current transaction TXN;

"null" as undo log pointer;

"false" as a value of deleted flag.

After transaction abort, the rows inserted by the Bz-tree should be removed from leaf pages. After transaction commit, the MVCC attributes of a row should be rewritten with an LSN of this transaction. In particular embodiments keys of the rows inserted by the transaction could be memorized in a linked list or any other data structure either in-memory or on-disk. Particular embodiments may perform removal of insertion of rows and TXN to LSN rewrites immediately on transaction commit, while others may do this in a lazy manner on next access to corresponding rows. Therefore, DBMS may store a map from TXN to LSN until all the occurrences of this TXN in the data would be rewritten with corresponding a LSN.

According to snapshot isolation, a transaction sees only committed row versions whose LSN is less than the snapshot LSN. Also, transactions may see uncommitted row versions made by itself. Reading appropriate row versions requires traversal over a chain of undo log records. This process is discussed further below.

Figure 2:
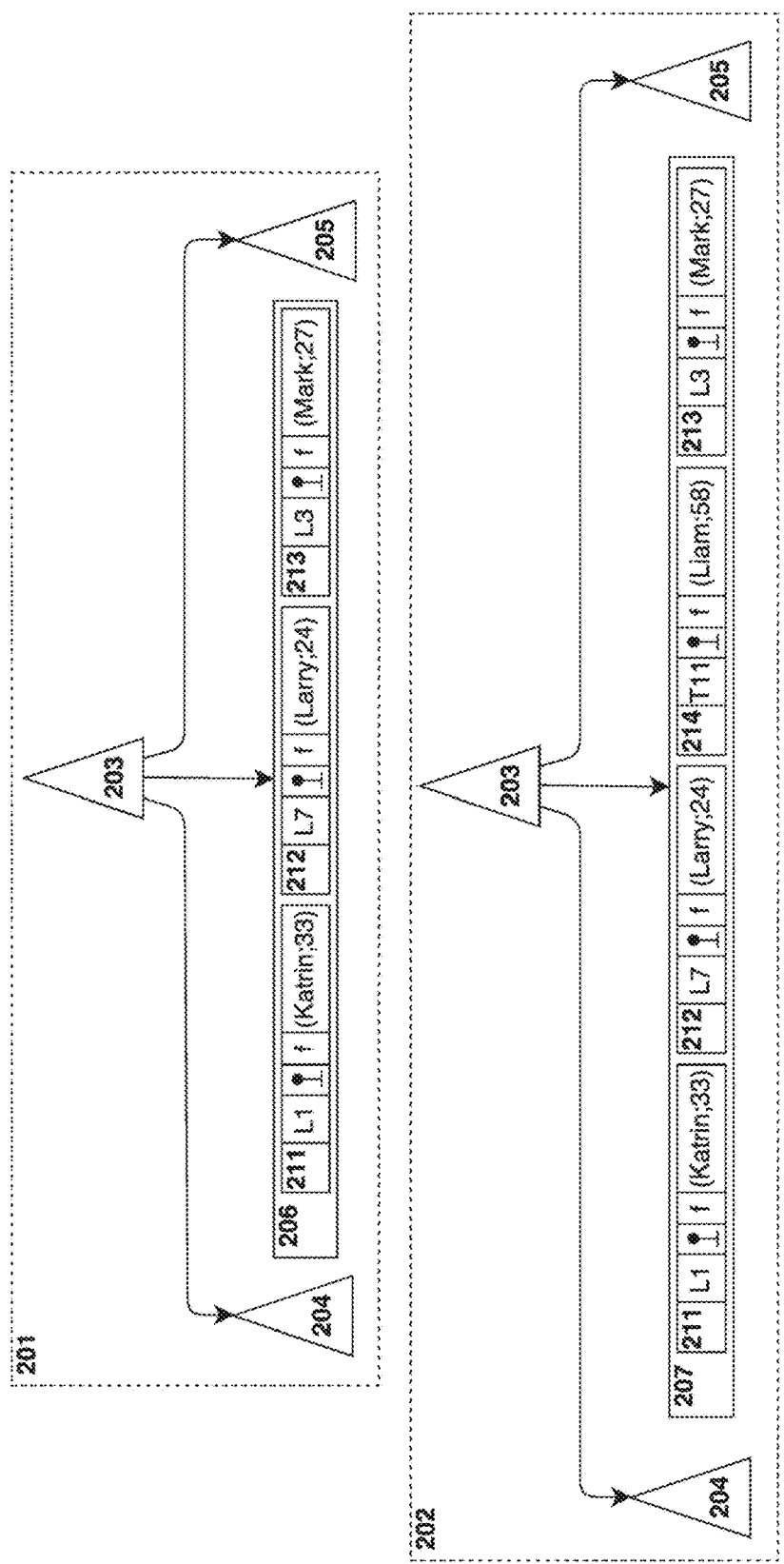
FIG. 2 is an example of insertion new tuple into Bz-tree.

FIG. 2 depicts an example of inserting a row 214 into a Bz-tree leaf page 207. In this example, new row 214 "(Liam;58)" is inserted to the appropriate leaf page 207 of Bz-tree 202 while there is enough of free space on the leaf page 207 to fit this new row 214. Bz-tree 201 represents the state before insertion. Bz-tree 202 represents the state after insertion. Leaf page 206 is the page where new row 214 is to be inserted. Rows 211-213 are rows of the leaf page 206. Sub-trees 203-205 are other parts of tree which are not modified during insertion and hidden in triangles for the sake of brevity. Leaf page 207 represents the same page as leaf page 206 but after insertion of the new row 214. The inserted row 214 has following MVCC attributes:

TXN of the transaction that has inserted this row. This value is "11" in this example;

"null" as the undo log pointer since there is no previous version of this row;

"false" as the value of the deleted flag.

If transaction 11 aborts, then row 214 should be deleted from the leaf page 207. If transaction 11 commits, then transaction number 11 in the row 214 should be rewritten with a corresponding LSN. These actions could be done either, in the lazy manner, on next access to the row 214, or immediately.

On the update of an existing row in the Bz-tree, the previous version of this row can be moved into the undo log, while the new version of this row replaces the old version in the leaf page. The new version of the row has following MVCC attributes:

current transaction TXN;

pointer to the undo log record containing the previous version of this row;

"false" as value of deleted flag.

After a transaction is abort, an updated version of row should be replaced with the previous version of this row from the undo log. After transaction commit, the TXN in the MVCC attributes of the updated version of row should be rewritten with an LSN of the corresponding transaction. In a similar way to the insertion of new row, particular embodiments may perform these actions immediately on a transaction abort or commit, while others may do this in the lazy manner on a next access to the updated row.

An undo log record with a previous version of row doesn't necessarily have to contain a previous row version "as is." Actually, it should contain enough of information to reconstruct the previous version of the row with a given current version of that row. Particular embodiments could put a previous version of row into such undo record as is. Other embodiments could store only the difference(s) between the current and previous versions of the row for the sake of space saving. For example, the difference(s) between row versions could contain values of only changed attributes.

The Bz-tree can rollback transactions even in an out-of-memory situation. Therefore, when an update makes the row shorter, released space remains reserved and not available for other operations until the transaction is finished. If the Bz-tree wouldn't reserve the space released by row update, then it would be possible that the reversion of the update requires a page split, which in turn may require additional memory.

Figure 3:
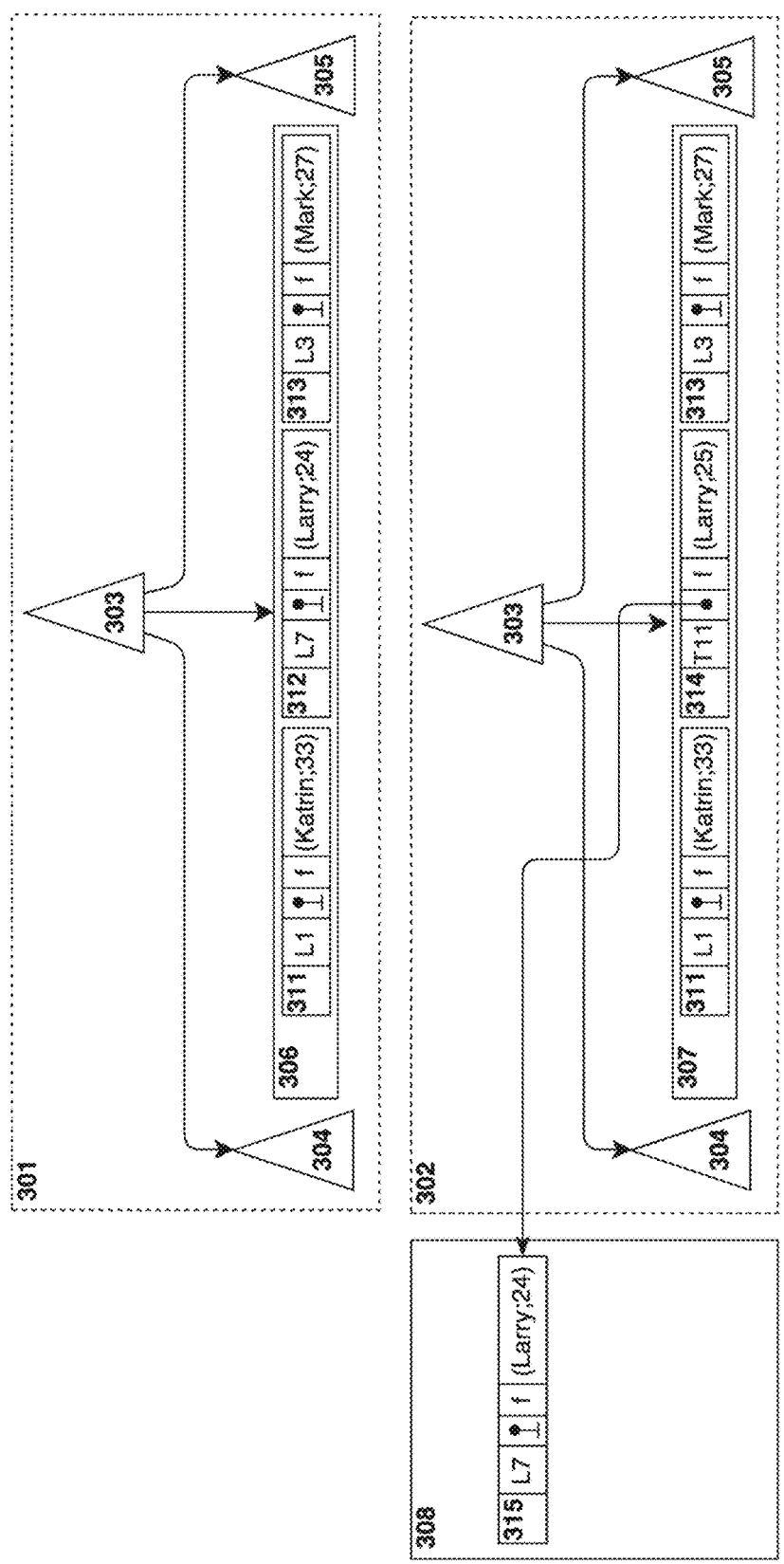
FIG. 3 is an example of update of Bz-tree tuple.

FIG. 3 depicts an example of a row update in a Bz-tree leaf page. In this example row "(Larry;24)" is updated to "(Larry;25)" in a leaf page of a Bz-tree, while the leaf page doesn't overflow during this row update. Bz-tree 301 represents the state before the update. Bz-tree 302 represents the state after the update. Undo log 308 stores row 312 in case it needs to be restored in the future. Leaf page 306 contains row 312 to be updated. Rows 311 and 313 are other rows of leaf page 306 which are left unmodified. Sub-trees 303-305 are other parts of the Bz-tree which are not modified during the row update and are hidden in triangles for the sake of brevity. Leaf page 307 represents the state of leaf page 306 after the row update. Row 314 is the updated version of row 312. The original version of row 312 is copied to the undo log record 315. The updated version of row 314 has the following MVCC attributes:

TXN of the transaction that has updated this row. This value is "11" in this example;

pointer to undo log record 315 which contains the previous version of this row;

"false" as the value of the deleted flag.

On delete of the existing row 312 in Bz-tree 301, the old version of row 312 isn't moved into undo log 308. Instead, only values of the MVCC attributes are moved into undo log record 315 produced by the row deletion. Bz-tree behaves so because it only has to reserve enough of space to be able to reverse the row delete if the transaction aborts. MVCC attributes of deleted row 312 are rewritten in-place as follows:

current transaction TXN;

pointer to undo log record containing previous values of MVCC attributes;

"true" as value of deleted flag.

After transaction abort, the previous values of the MVCC attributes in undo log record 315 should be restored from undo log 308. After transaction commit, the TXN in the MVCC attributes of the deleted version of row 312 should be rewritten with the LSN of this transaction. Similar to insertion and update, particular embodiments may perform these actions immediately on transaction abort or commit, while others may do this in a lazy manner on next access to the deleted row.

Figure 4:
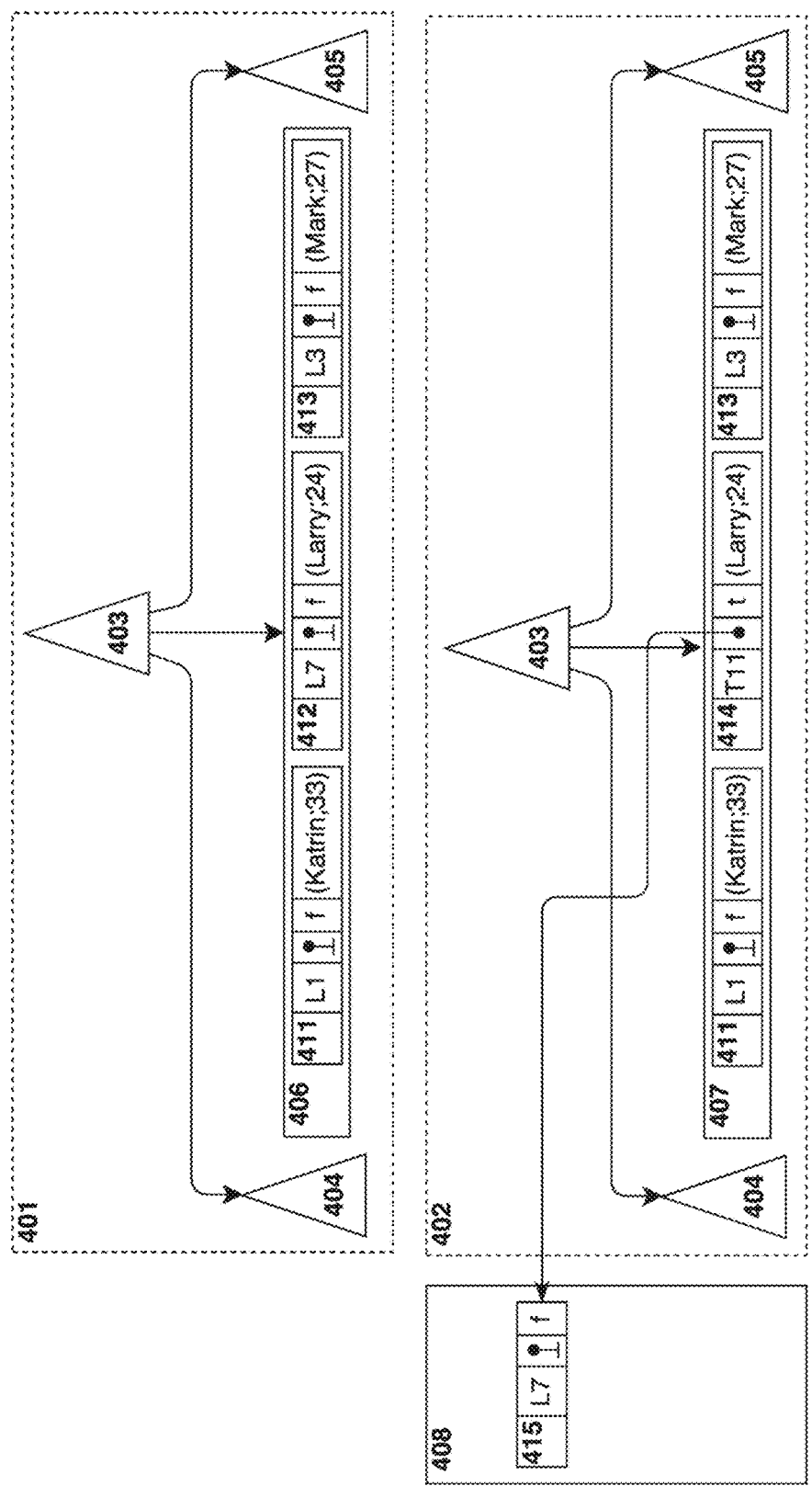
FIG. 4 is an example of deletion of Bz-tree tuple.

FIG. 4 depicts the example of row deletion in a Bz-tree leaf page. In this example row 412 containing "(Larry;24)" is deleted from leaf page 406 of Bz-tree 401. Bz-tree 402 represents the state after deletion. Undo log 408 contains undo log record 415. Leaf page 406 is the page where row 412 is to be deleted. Rows 411 and 413 are other rows of the leaf page 406 which are left unmodified. Sub-trees 403-405 are other parts of the tree which are not modified during deletion and hidden in triangles for the sake of brevity. Leaf page 407 represents the state of leaf page 406 after row deletion. Row 414 is the deleted row which still exists on the page, but has a "true" value of its deleted flag. Original header of the row 412 is copied to the undo log record 415. The deleted version of the row 414 has following attributes:

TXN of transaction that has deleted this row. It's "11" in this example;

pointer to undo log record 415 which contains the previous version of the row header;

"true" as value of deleted flag.

When a transaction inserts a new row into a leaf page, it's possible that a deleted row version already exists with the same key value. In this case, insertion would work the same way as update, i.e., the previous version of the row would be moved into the undo log 408.

Therefore, each row in a Bz-tree has a chain of zero or more undo records. Every transaction can find a row version which is visible according to its snapshot by traversing this chain of undo records. An undo log chain should be traversed until an LSN of the record becomes less than its snapshot's LSN.

In addition to the row-level MVCC described above, a Bz-tree may have page-level MVCC. Page-level MVCC can provide version support for operations which are dealing with not just individual rows, but whole pages. Such operations are: page split and page compaction. To support MVCC, each Bz-tree page can contain the following additional attributes:

LSN;

undo-log pointer: points to the undo record which is used to reconstruct previous version of page.

LSN identifies the moment of time when this version of page becomes visible to other transactions. If the snapshot LSN is less than or equal to the page LSN, then the previous page image should be reconstructed using the corresponding undo log record.

Page splits in B+-tree happen when that a page can't fit a new row or an updated version of existing row. After splitting a page into two, a new pivot key and a new downlink are inserted into the parent page. In turn, that may trigger a split of a parent page and so on up to the root. Bz-tree handles page splits in the same way as B+-trees, except it supports page-level MVCC for this operation. Before splitting, the image of the original page can be copied into the undo log. A page split operation has its own associated LSN which is independent from the LSN of the transaction that triggered the page split. Both pages produced by splitting are marked with this LSN and undo log pointer to the record containing the original page image. Therefore, any transaction reading any of those pages and having a snapshot taken before page split would follow the undo log pointer and find a page image taken before the split. The new pivot key inserted into the parent page is also marked with a page split LSN. That allows the transaction that has to read the previous page image from undo log to visit only one of the pages produced by split.

Figure 5:
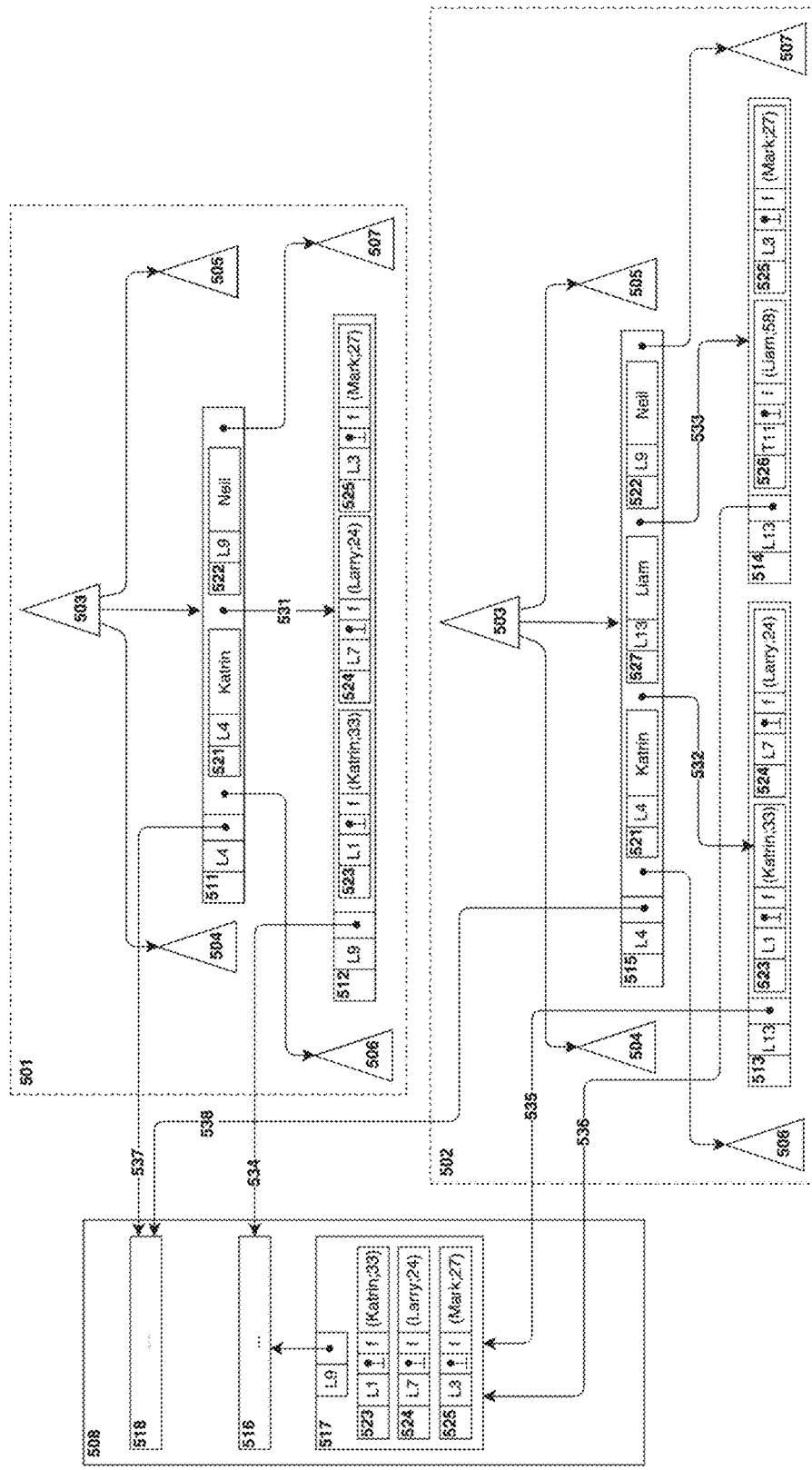
FIG. 5 is an example of page split during insertion into Bz-tree.

FIG. 5 depicts an example of page split during insertion into a Bz-tree leaf page. Bz-tree 501 represents the state before the page split. Bz-tree 502 represents the state after the page split. Undo log 508 includes records 516, 517, and 518. We show a single state of undo log 508 in this figure despite its contents changing after the page split because it's an append-only data structure. Thus, it's evident that records 516 and 518 existed before the page split because they were referenced before the split in Bz-tree 501. And record 517 was added during the page split because it was referenced only when Bz-tree 502 was created after the split.

Leaf page 512 is where a new row 526 is to be inserted. Leaf page 511 is the internal parent page which has downlink 531 to leaf page 512. Pivot keys 521 and 522 are pivot keys of internal page 511. Those pivot keys are associated with LSNs L4 and L9, respectively. Leaf page 512 has link 534 to its previous version stored in record 516 in undo log 508, including the associated LSN. The contents of 516 are hidden for the sake brevity. Sub-trees 503-507 are other parts of Bz-trees 501 and 502 and are not modified during insertion and hidden in triangles for the sake of brevity.

Leaf page 513 is an updated version of leaf page 512 after the split. Leaf page 514 is a new leaf page produced by the split. Existing leaf page 512 rows and the row to be inserted are divided between leaf pages 513 and 514. As we can see, rows 523 and 524 were not moved by the page split and reside on leaf page 513. Row 525 was moved to the new leaf page 514. Inserted row 526 is also placed to the new leaf page 514. New pivot key 527 and new downlink 533 were produced in the parent page after the split. Inserted row 526 has the following attributes:

TXN of transaction that inserted this row. It's "11" in given example;

null undo-log pointer since there is no previous version of this row;

"false" as value of deleted flag.

The page split LSN is "13" in the present example. The new pivot key 527 is marked with this LSN as well as leaf pages 513 and 514 produced by the split. Both leaf pages 513 and 514 have links 535 and 536 to a copy of leaf page 512 in undo log record 517. Those links are created with the split LSN L13. Therefore, transactions, which use snapshots taken before the page split would see the original version of leaf page 512. Since the split LSN specified in the pivot key 527 (L13) is greater than the snapshot LSN (L9), such transactions would traverse to link 532 instead of 533 even if the search key is greater than or equal to the pivot key. After that this transaction would read undo log record 517 containing the version of page 512 from undo log 508 because its snapshot LSN is less than the LSN specified in leaf page 513.

As mentioned above, Bz-tree can rollback any in-progress transaction without requiring additional memory. Thanks to that, in an out-of-memory situation, active transactions could be at least rolled back. Therefore, deleted rows aren't physically deleted from their Bz-tree pages before corresponding transactions are committed. After committing corresponding transactions, deleted versions of rows could be erased from each page in a bulk manner by page compaction. During page compaction, space occupied by deleted row versions can be released while the previous page version, including those row versions, is moved into the undo log. Embodiments could perform the page compaction at different points of time. For instance, particular embodiments could trigger the page compaction when a fraction of deleted rows in a page have reached some threshold value. Other embodiments could trigger the page compaction when insertion or update of a row lacks free space on the page.

Figure 6:
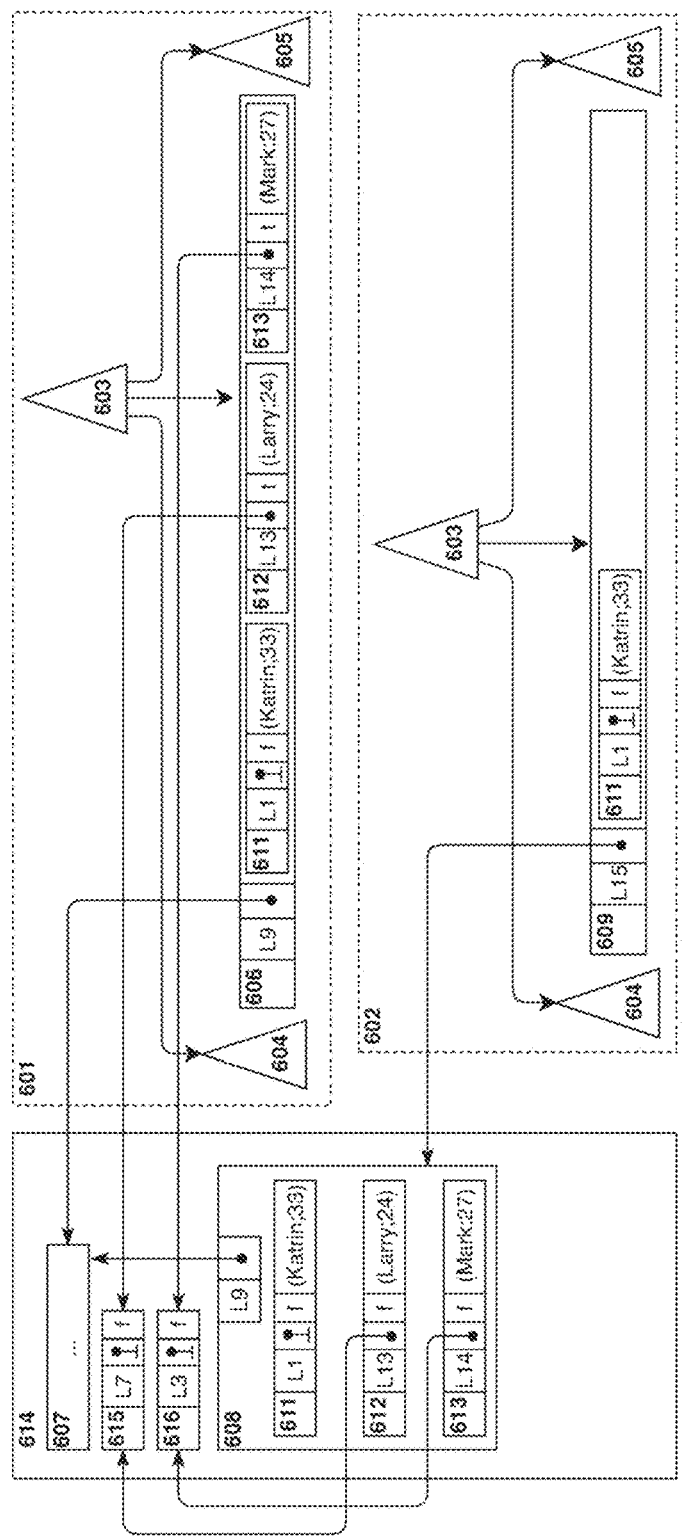
FIG. 6 is an example of Bz-tree page compaction.

FIG. 6 depicts an example of page compaction in a Bz-tree. Bz-tree 601 represents the before page compaction, while Bz-tree 602 represents the state after page compaction. Undo log 614 includes records 607, 608, 615, and 616. We show a single state of undo log 614 in the figure despite its contents changing after page compaction because it's an append-only data structure. Thus, it's evident that records 607, 615 and 616 existed before the page compaction, while undo log record 608 was added during the page compaction.

Leaf page 606 is the page to be compacted. Sub-trees 603, 604 and 605 aren't shown in detail and are hidden in triangles for the sake of brevity. Rows 612 and 613 were deleted by committed transactions and have previous versions of their MVCC attributes in undo records 615 and 616. Row 611 is not deleted. Leaf page 609 is a compacted version of the leaf page 606. The deleted rows 612 and 613 were completely erased from leaf page 609. Thus, space which was previously occupied by rows 612 and 613 is now available for further insertions and updates. The undo log pointer of leaf page 609 refers to undo log record 608 which contains a copy of page image before compacting leaf page 606. Also, during compaction leaf page 609 is assigned a new LSN (L15). Therefore, every snapshot taken before compaction would see the image of leaf page 606 instead the image of leaf page 609 itself. So, such snapshots would see rows 612 and 613.

Thereby, Bz-tree implements MVCC through attaching chains of zero or more records in the undo log for each page and row. When a transaction reads a Bz-tree according to some snapshot, it can follow the following rules:

when any Bz-tree page is read, the previous versions of that page should be reconstructed from the undo record chain unless the page LSN becomes less than the snapshot LSN, when any Bz-tree row is read, the previous versions of that row should be reconstructed from the undo record chain unless the row LSN becomes less than the snapshot LSN, after performing a binary search in a Bz-tree, if a pivot key on the left of the found downlink (e.g., pivot key 521 is to the left of link 532) has an LSN greater than or equal to the checkpoint LSN, then the next downlink to the left should be selected, unless the LSN of the pivot key on the left of the downlink becomes less than the checkpoint LSN or the leftmost downlink is selected. For example, when a checkpoint is taken before a page split, the DBMS should see one page instead of multiple. The DBMS will not use the new pages produced by splits, and instead use the original (leftmost) page and then fetches its old version from the undo log.

The algorithm described above allows reading the Bz-tree according to given a snapshot, which includes all the changes made by transactions committed before the moment of time when this snapshot was taken. This is sufficient for a majority of tasks. However, the repeatable read isolation level of a relational DBMS may require reading not only changes made by transactions committed before a snapshot was taken, but also reading uncommitted changes made by the current transaction. We will call such a snapshots a "mixed snapshot." Particular embodiments could implement a "mixed snapshot" by merging rows from the latest version of a page and a version of page reconstructed from undo log. Various optimizations are possible here. For example, if it's known that a current transaction didn't modify a particular Bz-tree, then a regular snapshot could be safely used instead of a mixed snapshot. Other embodiments could implement a "mixed snapshot" by accumulating modified rows into an auxiliary data structure in its private memory and merging those rows into rows read by a regular snapshot.

We will call the place where the Bz-tree is persistently stored at disk as the data file. We assume the data file to be linearly addressed space, which could be read or written at an arbitrary position, extended or truncated. Particular embodiments could implement a data file as single file in the file system. Other embodiments could implement the data file in a set of files in the file system. Still other embodiments could have low-level implementation of the data file without using the file system.

Bz-tree can implement copy-on-write checkpoints. These checkpoints are on-disk checkpoints of the Bz-tree, which could be used as the base for recovery by using WAL records. A checkpoint is a continuous process in time, which will be referred further as "checkpointing."

Most modern DBMSs perform checkpointing periodically to keep WAL size and recovery time in bounds. Once a checkpoint is taken, WAL records written before checkpointing start are not necessarily needed to recover.

Typically, checkpointing is performed in a DBMS by a separate process(es)/thread(s) allowing concurrent work with a database by other process(es)/thread(s). Checkpoints, which are taken concurrently with data modification operations are called "fuzzy." Bz-tree supports fuzzy checkpoints.

Since data modification operations may work concurrently with checkpointing, a checkpoint may contain images of pages corresponding to different moments of time. Then the whole checkpoint, consisting of these images taken together, do not necessary constitute a non-contradictory picture of data. Thus, checkpoints are not necessarily transactionally consistent. However, a checkpoint constitutes a correct tree: referentially integrated, height-balanced, correctly ordered and so on. So, checkpoints of a Bz-tree are "structurally consistent."

To control page writes, Bz-tree can store the following additional attributes in each in-memory page:

"dirty bit". This flag indicates whether the page has been modified since it was written to the data file last time. We will refer the page having a "dirty bit" set as a "dirty page";

location of on-disk page, associated with this in-memory page;

checkpoint number. This attribute identifies the number of the last checkpoint the on-disk image of this page was written to.

Checkpointing of Bz-tree can be made in a copy-on-write manner: that means on-disk page images written don't overwrite page images of a previous checkpoint. Instead on-disk page images are written to the free space of the data file.

During the checkpoint, dirty pages, their parent pages, parent pages of parent pages and upwards to the root of Bz-tree are written. Therefore, a page is written when either it is dirty or any of its children is dirty.

When a leaf page is written, all modifications made by in-progress transactions are reverted from the page image being written to the data file. Therefore, an on-disk leaf page image contains only data of already committed transaction while an in-memory page image may contain modifications made by in-progress transactions. Once an on-disk page is written, a corresponding in-memory page becomes associated with that on-disk page; the checkpoint number is updated accordingly, and the dirty bit is cleared. When a non-leaf page is written, all downlinks in the non-leaf page image being written are replaced with pointers to on-disk pages associated with the corresponding in-memory pages.

Dirty pages might be written to the disk not only by checkpointing. When a dirty page is to be evicted from the memory, it can be written to the disk first. Also, there might be some background writer process(es)/thread(s), which periodically writes some dirty pages to the disk to keep number of in-memory dirty pages in a manageable range.

When a dirty page is written to the disk not by checkpointing, then it may not override the on-disk image belonging to the last checkpoint. Instead, it's written to the free location of the data file in a copy-on-write manner. In this case, the checkpoint number of this in-memory page is updated to the number of next further checkpoint. Thus, the on-disk page image is written to the next checkpoint.

When a dirty page is written to the disk without checkpointing, while checkpointing is in-progress then different options are possible. If checkpointing didn't already traverse this page, then it's written to the current checkpoint. In another case when checkpointing already traversed this page, then it's written to the next checkpoint.

In the case of eviction, a corresponding downlink in the parent page should be changed to point the new on-disk image, and then the parent page itself marked as dirty. In the case of background writing, just parent page is marked as dirty, while checkpointer will take care about substitution of correct downlink in the parent page.

When a page is written a second and subsequent times to the same checkpoint, then it may override the same on-disk image.

Row modifications reverted from leaf page images to be written to the disk, can be written to the special data file called the "in-progress file." Therefore, contents of the in-progress file may be enough to restore the state of all the in-progress transactions existing during checkpointing. Once the checkpoint is completed, the in-progress file of the previous checkpoint may be deleted because it's not needed for recovery anymore. Embodiments may implement different formats of the in-progress file. For example, the in-progress file may consists of record of following types:

"row insert" record consists of TXN and row,

"row update" record consists of TXN and row,

"row delete" record consists of TXN and key.

A particular embodiment may not evict pages modified by in-progress transactions. Therefore, a total amount of pages modified by in-progress transactions in this embodiment may not be greater than the total amount of memory allocated for in-memory pages.

Other embodiments allow eviction of pages modified by in-progress transactions. This embodiment allows a total amount of pages modified by in-progress transactions to be greater than the total amount of memory allocated for in-memory pages. In that embodiment, the content of an evicted page is written to the disk "as is," including rows modified by in-progress transaction(s). During checkpointing, pages, which were modified by in-progress transactions, are loaded into memory and then their on-disk images are rewritten in-place after revert of the modifications made by in-progress transactions. After being rewritten, these pages are considered dirty. If they have to be evicted after being rewritten in-place, then they may be written to the free space.

Therefore, when a checkpoint completed the new root is written to the data file. Checkpoint meta-information should include the address of the on-disk root page. Starting from this root, one could read a checkpoint of the Bz-tree which includes pages written during this checkpointing as well as pages written during previous checkpointings. Some pages of previous checkpoints may be unused in this checkpoint, i.e., they couldn't be found from root page written during this checkpointing. Once a checkpointing is completed, such unused pages can be considered freed, and the corresponding data file space may be available for further writes.

The checkpoint process may take a substantial amount of time. Thus, while creating a checkpoint, concurrent data modifications may occur, and transactions may be committed and/or aborted. Despite a checkpoint being structurally consistent, it contain may page images taken during various moments of time. Therefore, a checkpoint may contain row versions that existed in various moments of time: from the beginning of the checkpoint process to the end.

Figure 7:
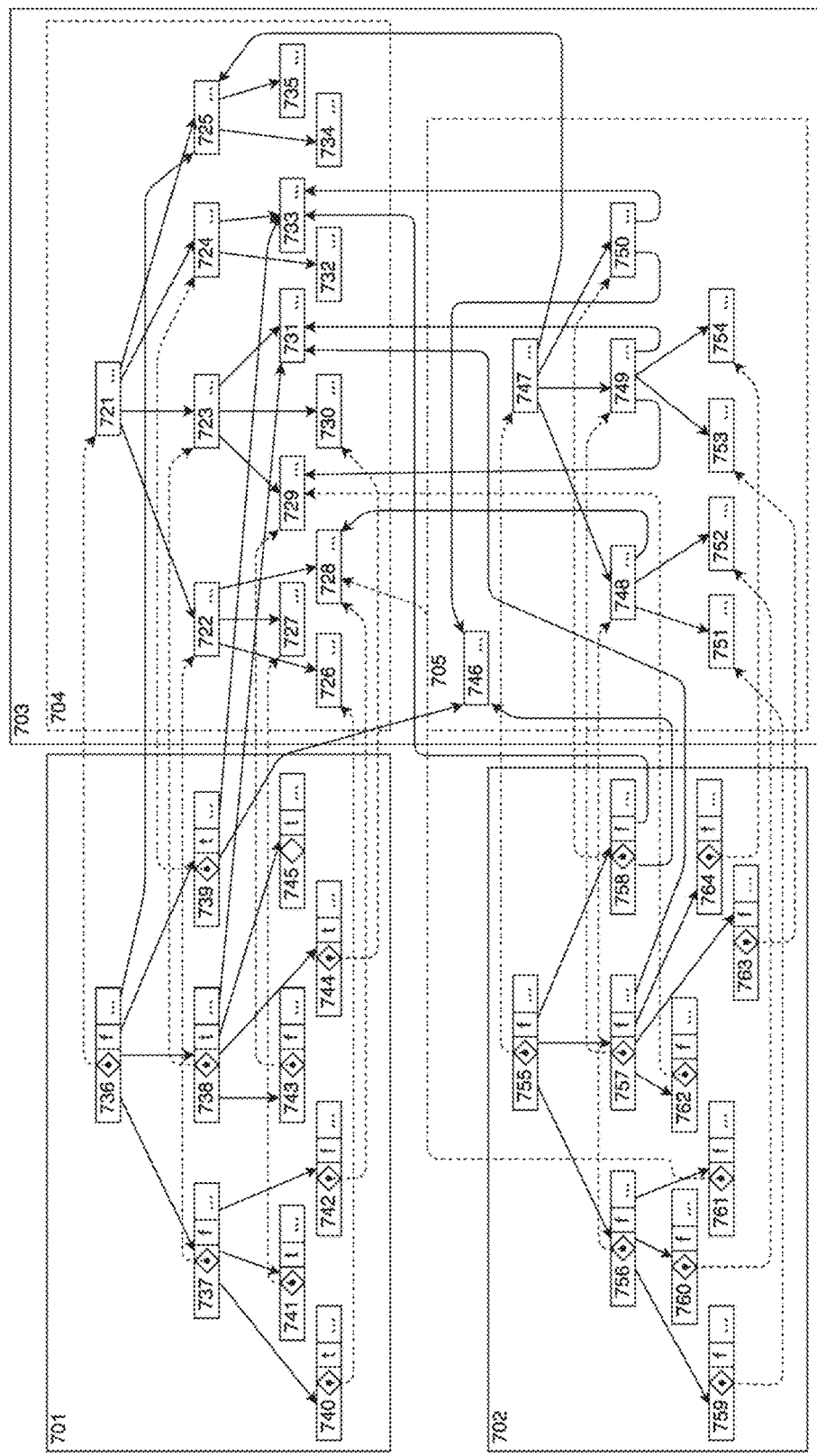
FIG. 7 is an example of Bz-tree checkpoint to the durable computer-readable

FIG. 7 depicts an example of checkpointing in the Bz-tree. Bz-trees 701 and 702 are in-memory states of the Bz-tree before and after the checkpoint, respectively. Bz-tree 703 is the on-disk image of the Bz-tree, where 704 contains a previous checkpoint of Bz-tree 701, and Bz-tree 705 contains pages written during subsequent checkpointing. For the sake of brevity, no internal data of on-disk pages 721-754 are shown in the figure, except downlinks which are depicted as solid arrows. For each in-memory page 736-763, in addition to downlinks, the following information is shown:

link to the associated on-disk page (rhombus and outgoing dash arrow);

dirty bit: "t" stands for true, "f" stands for false.

The in-memory state of the Bz-tree 701 is before checkpointing depicted. Root page 736 is linked to the on-disk root page 721. The dirty bit of the page 736 is false because its pivot keys and downlinks are not modified. Root page 736 has three downlinks to in-memory pages 737-739 and one downlink to on-disk page 725. The leftmost child of root page 736 is an internal page 737 which is linked to the on-disk page 722 and also not modified. Internal page 737 has downlinks to three leaf pages 740-742 which are linked to on-disk pages 726-728. Two of them, pages 740-741 are modified, but without splitting. The next child of root page 736 is internal page 738 which is liked to on-disk page 723. This page is marked as modified, because its child page was split producing pages 744 and 745. Internal page 738 has four downlinks: unmodified page 743 which is linked to on-disk page 729, modified page 744 which was split and linked to on-disk page 730, modified page 745 which is new page produced by split of 744 and it's not linked with any on-disk page, and on-disk page 731. The next child of root page 736 is internal page 739 which is linked to on-disk page 724. Internal page 739 has downlinks to on-disk pages 746 and 731. This internal page 739 is modified because it has a downlink that has changed from on-disk page 732 to on-disk page 746. On-disk page 746 is a modified version of page 732 which was evicted to disk after modification. The rightmost child of root page 736 is on-disk internal page 725 which belongs to an unmodified part of the Bz-tree.

Let us consider the in-memory state of the Bz-tree after the checkpointing and disk writes corresponding to that checkpointing. Since non-leaf in-memory pages are written to disk not only when they are modified, but also after their children have been written to disk, we consider the tree in a "from bottom to top" manner. Leaf pages 759 and 760 are post-checkpointing versions of pages 740 and 741, which were changed since the previous checkpointing. Therefore, they were flushed to new on-disk pages 751 and 752 in a copy-on-write manner, and have their dirty bits cleared. Leaf pages 742 and 743 are unchanged since previous the checkpointing. Thus, their post-checkpointing versions, leaf pages 761 and 762 aren't flushed to the disk. Pages 744 and 745 were produced by the page split which happened after the previous checkpointing. Page 744 is the left split page and it's linked with pre-split on-disk image 730. Page 745 is the right split page and it's not yet linked with any on-disk image. Post-checkpointing versions of pages 744 and 745 are pages 763 and 764, which were flushed to new on-disk pages 753 and 755, and their dirty bits were cleared.

Internal page 756 is the post-checkpointing version of the page 737 whose contents were not changed after the previous checkpointing. However, since page 756 has its children changed, it's flushed to new disk page 748 in copy-on-write manner. Page 738 has both changed children and its dirty bit set because its contents were changed. Therefore, its post-checkpointing version, page 757, was flushed to the new on-disk page 749. Page 739 had its dirty bit set because its downlink changed. Thus, its post-checkpointing version, page 758, is also written to the new on-disk page 750.

The page 755 is the post-checkpointing version of the root page 736 which has all its children written to the disk. Therefore, 755 was flushed to the new disk page 747.

Figure 8:
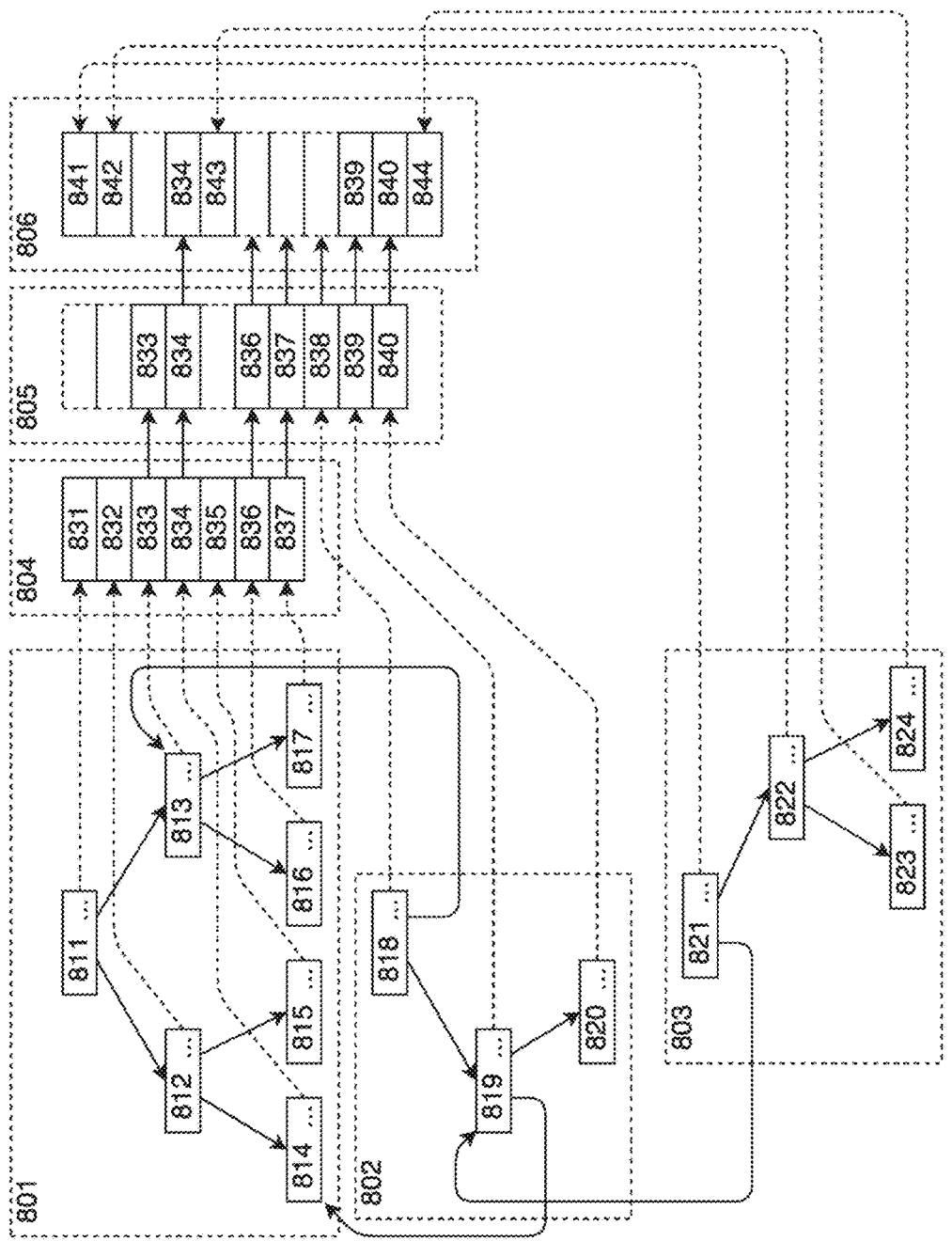
FIG. 8 is an example of space usage in multiple checkpoints of Bz-tree.

FIG. 8 depicts an example of disk layout of checkpoints. BZ-tree 801 depicts the logical structure of the checkpoint produced by the first checkpoint 804, illustrated physically on disk as sequential blocks 831-837. A block is a contiguous chuck of memory that can store any generic data. In this implementation, the blocks 831-837 can store copies of pages for a checkpoint. Bz-trees 802 and 803 illustrate the logical structure of checkpoints 805 and 806, respectively, which are incremental and reuse parts of pages written during previous checkpointings.

During the second checkpointing, the following pages were written: the root page 818, its left child, internal page 819, and its right child, leaf page 820. These pages are appended as blocks 838-840 to second checkpoint 805 on disk. The second checkpoint 805 reuses pages 813, 814, 816, 817, which were written during the initial checkpointing. Simultaneously, after the second checkpointing, pages 811, 812, and 815 become unreferenced. Therefore, corresponding blocks 831, 832, 835 are marked as free when the second checkpoint 805 is completely taken.

During the third checkpointing, the following pages were written: root page 821, its right child internal page 822 and its children 823, 824. These pages fulfill free gaps in the data file 841, 842, 843, and one page is appended 844. Third checkpoint 806 reuses pages 819, 820 which were written during second checkpoint 805, and page 814 which was written during the first checkpointing 804. Simultaneously, after third checkpoint 806 is taken, pages 813, 816-818 become unreferenced. Therefore, corresponding blocks 833, 836-838 are marked as free when the third checkpoint 806 is completely taken.

As was mentioned before, the Bz-tree provides durability. After a system crash, Bz-tree could be recovered once disk media was saved. Besides a completely taken checkpoint, recovery of Bz-tree can also use WAL records starting from the beginning of checkpointing and at least to the end of checkpointing. Checkpoint meta-information should include WAL-locations of checkpointing start and checkpointing end. Embodiments may implement different formats of WAL records. In general, there are two general properties to WAL record format. The first is that modifications of a tree can be encoded at row-level, i.e., replay of WAL records should turn into insertions, updates and deletions of Bz-tree rows. The second property is that WAL records should be idempotent: replay of changes which were already applied shouldn't cause any errors. Particular embodiments could have following types of WAL records:

"row insert" record consists of TXN and row,
"row update" record consists of TXN and row,
"row delete" record consists of TXN and key,
"transaction commit" record consist of TXN and LSN.

Bz-tree could be used as a secondary data structure. For example, Bz-tree could serve as a secondary index for a table, document set or set of other data items. In the case that a secondary Bz-tree may have no explicit WAL-records, secondary Bz-tree data modification operations (insertions, updates and deletions of rows) could be decoded from WAL-records for the primary data structure.

Bz-tree recovery process can consist of the following steps:

load of the root on-disk page from last completely taken checkpoint to main memory loaded in-memory page becomes the root of the in-memory part of the Bz-tree, apply records from the in-progress file to the Bz-tree, replay the WAL-records starting from checkpointing begin.

Replay of WAL-records may continue to the last WAL record written, or it could stop earlier, implementing pointin-time recovery (PITR). In the case of PITR, replay of WAL-records should continue at least to the checkpointing end.

Bz-tree can support optional compression of on-disk pages. In this case, the on-disk pages can be compressed using, for example, lz4, snappy, or zstd. A data compression algorithm can used as a black box which takes a page image as input and returns a compressed page image. Compressed page images are variable-size, i.e., their sizes depend on compress ratio of the particular data with the particular compression algorithm. In rare cases, a compressed page image could be even larger than an uncompressed page image.

When the compression of on-disk pages is enabled, pages are compressed before being written to disk either by eviction, background writing or checkpointing. Also, pages are uncompressed after reading from disk. Since, on-disk pages have a variable-size, an appropriate data structure can be used to manage variable-size areas of free space in the Bz-tree data file. Particular embodiments can use a linked list of free areas to manage variable-sized areas of free space. When a page is evicted a second or subsequent time after the last checkpointing, then it might be impossible to rewrite the on-disk page image in-place because its size might be increased. In this case the new on-disk page image is written to the free space of the data file, while the previous on-disk page image is marked as free space, the parent page downlink is updated accordingly.

Figure 9:
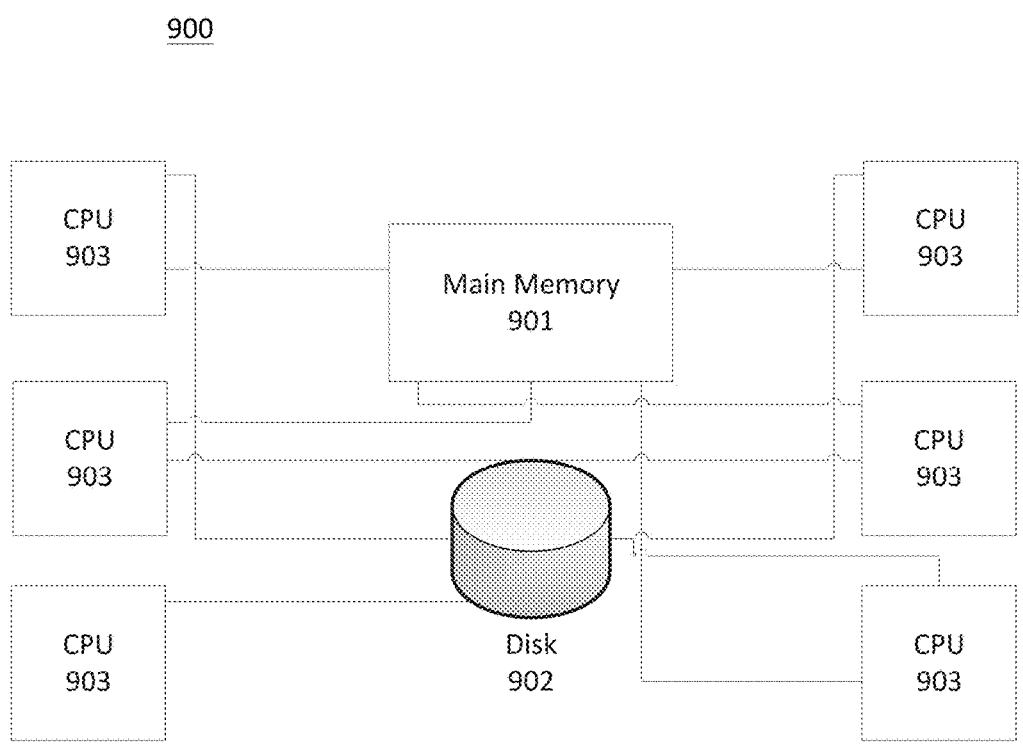
FIG. 9 is an example of a system in accordance with some embodiments of the disclosure.

FIG. 9 illustrates a system 900 comprising a main memory 901, a disk 902, and six CPUs 903. In this illustrative arrangement, each CPU has independent interfaces with main memory 901 and disk 902. Alternative embodiments can sharing interfaces or busses between components. Embodiments can also include having a main memory and disk corresponding to each CPU. The main memory can be, for example, a volatile memory, such as dynamic random access memory (DRAM). The disk can be a hard disk drive (HDD) or a solid state drive (SSD).

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of embodiments should not necessarily be limited by this description.

Unless specifically stated otherwise as apparent from the following discussion, it is appreciated that throughout the description, discussions utilizing terms such as "writing," "reading," "processing," "computing," "transmitting," "receiving," "determining," "displaying," "identifying," "presenting," "establishing," or the like, can refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this embodiment.

The exemplary embodiments can relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology can be located at distant portions of a distributed network or the Internet, or within a dedicated secured, unsecured, addressed/encoded or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiment (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate the embodiment and does not pose a limitation on the scope of the embodiment unless otherwise claimed. No language in the specification should be construed as indicating any non-claimed element as essential to the practice of the embodiment.

Presently preferred embodiments of this embodiment are described herein, including the best mode known to the inventors for carrying out the embodiment. Variations of those preferred embodiments may become apparent to those of ordinary skill in the art upon reading the foregoing description. The inventors expect skilled artisans to employ such variations as appropriate, and the inventors intend for the embodiment to be practiced otherwise than as specifically described herein. Accordingly, this embodiment includes all modifications and equivalents of the subject matter recited in the claims appended hereto as permitted by applicable law. Moreover, any combination of the above-described elements in all possible variations thereof is encompassed by the embodiment unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

I claim:

1. A method of comprising:
   writing, by a processor to a memory space, a root page of a tree, wherein the root page comprises one or more downlinks directly pointing to one or more pages, and the root page is configured to store a first plurality of pivot keys;
   writing, by the processor to the memory space, a plurality of internal pages of the tree, wherein each internal page comprises one or more downlinks directly pointing to one or more pages, and the plurality of internal pages are configured to store a second plurality of pivot keys;
   writing, by the processor to the memory space, a plurality of leaf pages of the tree, wherein the plurality of leaf pages are configured to store a plurality of rows;
   writing, by the processor, a first checkpoint representing a first state of the tree, comprising a copy of each page as a respective block, to a disk;
   during writing of the first checkpoint, writing, by the processor, a modification to one or more of the pages;
   writing, by the processor, at least one modification to the one or more pages after writing the first checkpoint; and
   writing, by the processor, a second checkpoint, of a second state of the tree, to the disk;
   wherein the second checkpoint comprises pointers to a plurality of blocks of the first checkpoint corresponding to unmodified pages,
   wherein the first checkpoint remains unmodified until the second checkpoint is completed.

2. The method of claim 1, wherein after the second checkpoint is completed, the modified blocks of the first checkpoint are treated as free space.

3. The method of claim 1 further comprising:
   writing, by the processor, an instruction to main memory to generate a modified page; and
   writing, by the processor, an instruction to the main memory to set a dirty bit of the modified page.

4. The method of claim 3 further comprises:
   delaying, by the processor, writing the modified page to the disk;
   receiving, by the processor, a request to read the modified page; and
   sending, by the processor, a read request to the main memory to read the modified page after setting the dirty bit.

5. The method of claim 3, wherein prior to writing a page to the main memory or the disk, the processor writes information corresponding to the page to a write-ahead log (WAL) record.

6. The method of claim 5, wherein each WAL record is idempotent.

7. The method of claim 6, wherein the WAL comprises one or more WAL records that correspond to the tree and one or more additional trees.

8. The method of claim 6 further comprising:
   initiating, by the processor, a database recovery process;
   reading, by the processor, a last completed checkpoint from the disk;
   writing, by the processor, the last completed checkpoint to the main memory and the disk; and
   writing, by the processor, WAL records to recover a last state.

9. The method of claim 5 further comprising:
   after a crash, restoring the second checkpoint; and
   replaying a plurality of records of the WAL.

10. The method of claim 1, wherein the downlinks comprise physical addresses to a main memory and the disk.

11. A system comprising:
    one or more processors;
    a main memory coupled to the one or more processors;
    a disk coupled to the one or more processors;
    the one or more processors are configured to:
    write a plurality of pages to the main memory and the disk, wherein the pages comprise a root page, one or more internal pages, and one or more leaf pages;
    write one or more pivot keys to the root page, wherein the root page comprises one or more downlinks directly pointing to one or more pages; and
    write one or more pivot keys to the one or more internal pages, wherein each of the one or more internal pages comprises one or more downlinks directly pointing to one or more pages;
    write a first checkpoint, comprising copies of the plurality of pages as respective blocks, to the disk;
    during the write of the first checkpoint, write a modification to one or more of the pages;
    write at least one modification to the one or more pages after writing the first checkpoint; and
    write a second checkpoint, comprising copies of new and modified pages as respective blocks, to the disk;

wherein the second checkpoint comprises pointers to a plurality of blocks of the first checkpoint corresponding to unmodified pages, wherein the first checkpoint remains unmodified until the second checkpoint is completed.

12. The system of claim 11, wherein the downlinks comprise physical addresses to the main memory and the disk.

13. The system of claim 11, wherein the one or more processors are further configured to:

write an instruction to main memory to generate a modified page;

write an instruction to set a dirty bit of the modified page;

receive a request to read the modified page; and send a read request to main memory to read the modified page.

14. The system of claim 13, wherein the modified page is not written to the disk between setting the dirty bit and reading the modified page.

15. One or more non-transitory computer readable media comprising instructions that, when executed by one or more processors, cause:

write a root page of a tree to a memory space, wherein the root page comprises one or more downlinks directly pointing to one or more pages, and the root page is configured to store a first plurality of pivot keys;

write a plurality of internal pages of the tree to the memory space, wherein each internal page comprises one or more downlinks directly pointing to one or more pages, and the plurality of internal pages are configured to store a second plurality of pivot keys; and write a plurality of leaf pages of the tree to the memory space, wherein the plurality of leaf pages are configured to store a plurality of rows;

write a first checkpoint representing a first state of the tree, comprising a copy of each page as a respective block, to a disk; and during the write of the first checkpoint, write a modification to one or more of the pages;

write at least one modification to the one or more pages to the first checkpoint; and write a second checkpoint, of a second state of the tree, to the disk;

wherein the second checkpoint comprises pointers to a plurality of blocks of the first checkpoint corresponding to unmodified pages, wherein the first checkpoint remains unmodified until the second checkpoint is completed.

16. The non-transitory computer readable media of claim 15 further comprising instructions that, when executed by the one or more processors:

write an instruction to main memory to generate a modified page; and write an instruction to the main memory to set a dirty bit of the modified page.

17. The non-transitory computer readable media of claim 16 further comprising instructions that, when executed by the one or more processors:

delay the write of the modified page to the disk; and receive a request to read the modified page; and send a read request to the main memory to read the modified page after setting the dirty bit.

18. The non-transitory computer readable media of claim 16, wherein prior to writing a page to the main memory or the disk, the one or more processors are configured to execute instructions to write information corresponding to the page to a write-ahead log (WAL) record.

19. The non-transitory computer readable media of claim 18, wherein each WAL record is idempotent.

20. The non-transitory computer readable media of claim 19, wherein the WAL comprises one or more WAL records that correspond to the tree and one or more additional trees.

\* \* \* \* \*